E. H. DEWSON.
CLASP BRAKE.
APPLICATION FILED JAN. 31, 1913.
1,183,858.
Patented May 23, 1916.
2 SHEETS—SHEET 1.
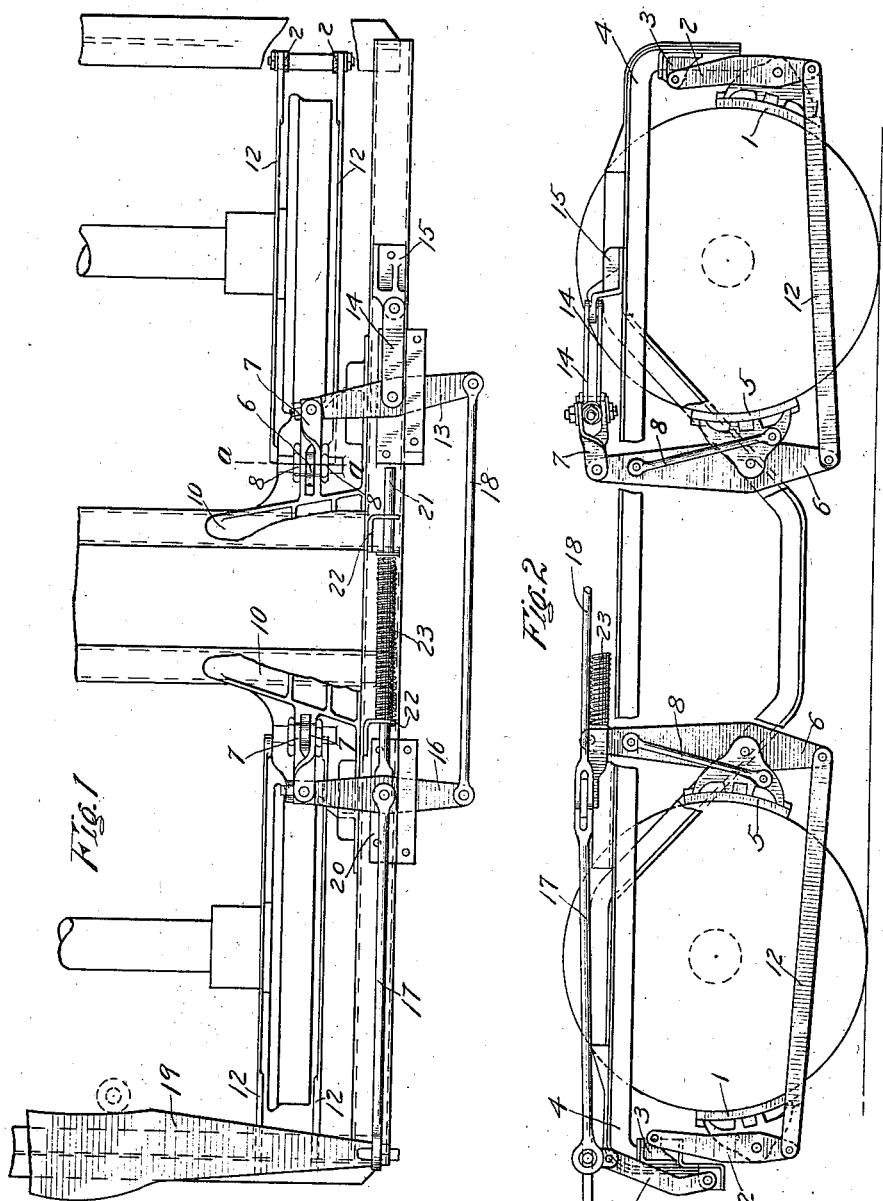
WITNESSES
INVENTOR.
Edward H. Dewson
by Wm. M. Cady
Att'y.

E. H. DEWSON.
CLASP BRAKE.
APPLICATION FILED JAN. 31, 1913.
1,183,858.
Patented May 23, 1916.
2 SHEETS—SHEET 2.
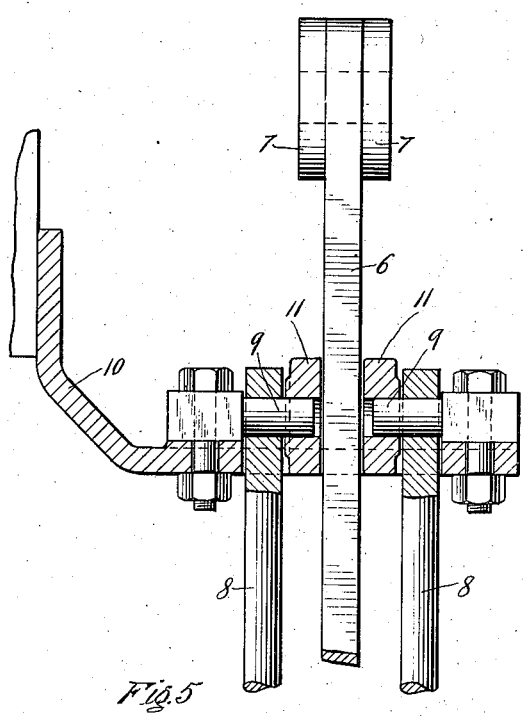
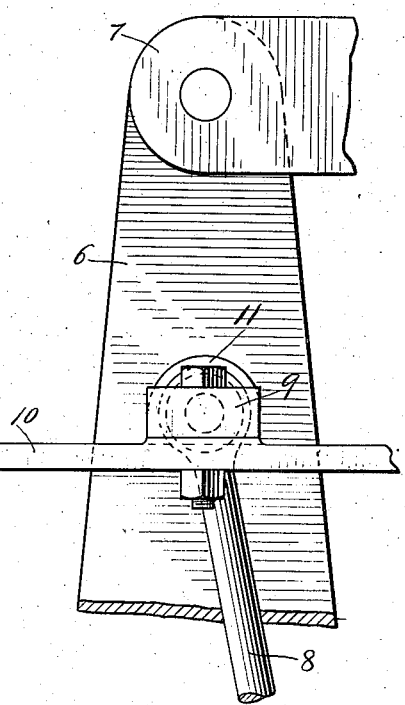
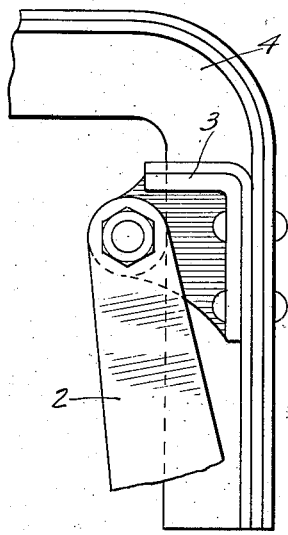
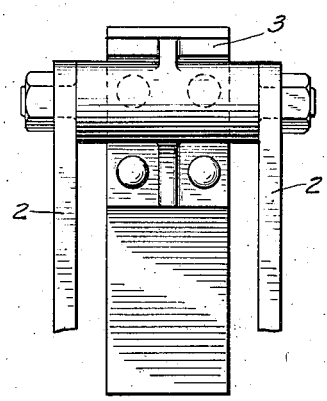
WITNESSES
INVENTOR
Edward H. Dewson
by Wm. M. Cady
Att'y.

UNITED STATES PATENT OFFICE.

EDWARD H. DEWSON, OF NEW YORK, N. Y., ASSIGNOR, BY MESNE ASSIGNMENTS, TO THE AMERICAN BRAKE COMPANY, OF ST. LOUIS, MISSOURI, A CORPORATION OF MISSOURI.

CLASP-BRAKE.

1,183,858.   Specification of Letters Patent.   Patented May 23, 1916.

Application filed January 31, 1913. Serial No. 745,343.

*To all whom it may concern:*

Be it known that I, EDWARD H. DEWSON, a citizen of the United States, residing at New York, in the county of New York and State of New York, have invented new and useful Improvements in Clasp-Brakes, of which the following is a specification.

This invention relates to brake rigging for railway cars, and more particularly to a brake rigging adapted for that type of brake in which a brake shoe is applied to opposite sides of each wheel and known as the clasp brake.

One object of my invention is to provide a brake rigging construction in which brake beams are not required.

Another object of my invention is to provide a brake rigging in which the radius bar is pivotally supported so as to avoid the use of the usual slide supports and also permit the employment of the force of gravity to assist in the release of the brakes.

Another object of the invention is to provide an improved brake rigging having all of the members in tension.

Other objects and advantages will appear in the following more detailed description of the invention.

In the accompanying drawings: Figure 1 is a top plan view of substantially one half of a car truck and the brake rigging therefor, with my invention applied thereto; Fig. 2 a side elevation thereof; Fig. 3 a vertical transverse section on the line *a—a* of Fig. 1, showing the inner brake shoe supporting mechanism in detail; Fig. 4 a side elevation thereof; Fig. 5 a side elevation of the lever support for one of the outside brake shoes; and Fig. 6 a face view thereof.

According to the construction illustrated in the drawings, brake shoes 1 and 5 are applied to opposite sides of each wheel, the outside shoe 1 being pivotally supported by and between a pair of brake levers 2 pivotally hung from a casting 3 secured to the truck frame 4. Each inside shoe 5 is pivoted to a truck lever 6, the upper end of which is pivotally connected to and between the links 7. The inside brake shoes are also supported by brake shoe hangers 8 arranged on opposite sides of each brake shoe. As shown more clearly in Fig. 3 of the drawings, each hanger 8 is pivotally mounted on a pivot pin 9 secured to gusset plate 10, said pins having bearings at their inner ends in lugs 11 on the gusset plate 10. The truck lever 6 passes through a slot in the gusset plate intermediate the adjacent lugs 11 and the lower end of the lever 6 is pivotally connected intermediate a pair of tie rods 12, the opposite or outer ends of which are pivoted to the lower ends of the levers 2. The links 7 are made with a quarter turn and the outer ends thereof are pivotally connected to one end of equalizing levers 13 and 16.

The equalizing lever 13 is centrally fulcrumed between links 14, pivotally supported by a casting 15 secured to the truck frame 4. The outer end of said lever 13 is pivoted to a tie rod 18, the opposite end of which is pivotally connected to the outer end of the equalizing lever 16.

Centrally pivoted to the lever 16 is a pull rod 17 and said pull rod 17 is pivoted to a radius bar 19. The brake rigging is arranged as above described on the opposite side of the truck and is also connected to the radius bar 19. The radius bar 19 is supported on opposite sides by means of links 24 pivotally mounted on the truck frame and pivotally connected to the radius bar.

For guiding and supporting the equalizing lever 16 a plate 20 is suitably secured to the truck frame in a position under the central portion of the equalizing lever.

To assist in releasing the brakes a release spring 23 may be provided, said spring being adapted to act on a release rod 21 slidably mounted in brackets 22 secured to the truck frame. The release rod 21 is pivotally connected to the equalizing lever 16, so that when the brakes are applied, the spring 23 is compressed and when the brakes are released the expansion of the spring acts to assist the release movement of the parts.

By supporting the radius bar on the pivoted links 24, the weight of the brake rigging acts so as to rock said links in a direction adapted to assist in the release of the brakes.

It will now be seen that the brake rigging construction herein described dispenses with brake beams, and that the transmission members are so disposed that said members are all in tension, thus obviating compression members and the attendant disadvantages.

Having now described my invention, what

I claim as new and desire to secure by Letters Patent, is:—

1. A beamless brake rigging for clasp brakes comprising brake levers connected to brake shoes applied to opposite sides of each car wheel, a tie rod connecting the lower ends of said levers, an equalizing lever operatively connected to one brake lever for each wheel, and a tie rod connecting the equalizing levers for adjacent wheels.

2. A beamless brake rigging for clasp brakes comprising brake levers connected to brake shoes applied to opposite sides of each car wheel, a tie rod connecting the lower ends of said levers, an equalizing lever operatively connected to each inside brake lever, a tie rod for connecting the adjacent equalizing levers on each side of the car truck, a radius bar, and a pull rod for connecting an equalizing lever on each side of the truck with said radius bar.

3. In a brake rigging for railway cars, the combination with a radius bar, of members pivotally secured to the car truck frame for supporting said radius bar.

4. In a brake rigging for railway cars, the combination with a radius bar, of members pivotally secured to the car truck frame and pivotally connected to said radius bar for supporting the same, the weight of the brake rigging having a tendency to rock said members in a direction adapted to release the brakes.

5. A car brake rigging comprising brake levers connected to brake shoes on opposite sides of each car wheel, the outside brake levers being fulcrumed on the car truck frame, a tie rod pivotally connecting the lower ends of the brake levers for each wheel, links connected to the upper ends of the inside brake levers, an equalizing lever connected to the links for each brake lever, one equalizing lever being centrally fulcrumed on the car truck frame, a tie rod for connecting the outer ends of the equalizing levers at each side of the truck, a pull rod connected to the other equalizing lever, and a radius bar connected to the pull rods on opposite sides of the truck.

6. A beamless brake rigging for clasp brakes comprising brake levers connected to brake shoes applied to opposite sides of each car wheel, a tie rod connecting the lower ends of the levers for each wheel, an equalizing lever operatively connected to each inside brake lever, and a tie rod operatively connecting the equalizing levers at each side of the truck, said rods being in tension.

In testimony whereof I have hereunto set my hand.

EDWARD H. DEWSON.

Witnesses:
ALEXANDER BEGG,
E. W. DAVIS.